Sept. 15, 1953
G. L. OSWALT
2,651,827
VIBRATING MECHANISM
Filed Feb. 27, 1948
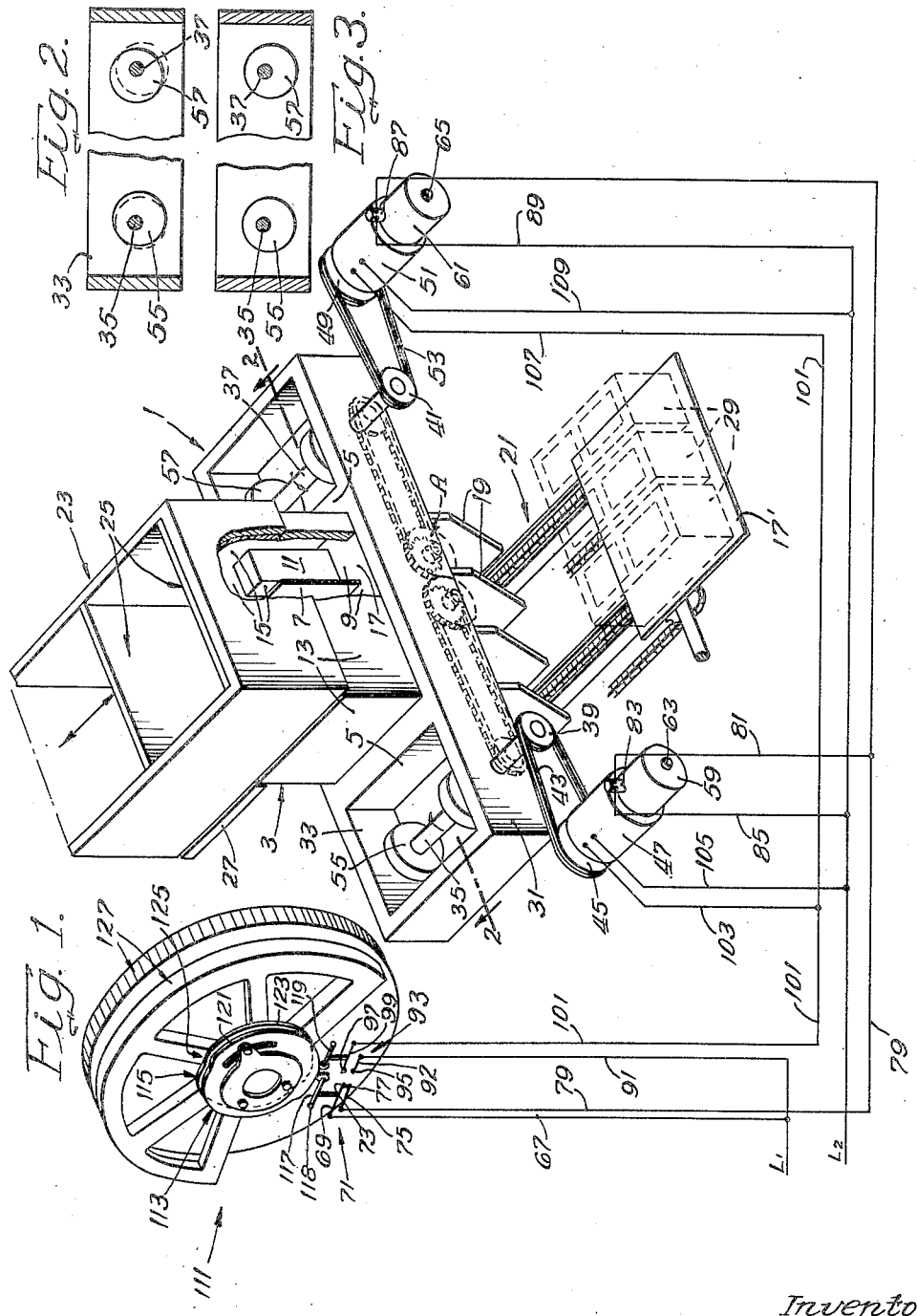
Inventor:
George L. Oswalt
By Brown, Jackson, Boettcher & Dienner.
Attys.

Patented Sept. 15, 1953

2,651,827

UNITED STATES PATENT OFFICE 2,651,827

VIBRATING MECHANISM

George L. Oswalt, Forest Park, Ill.

Application February 27, 1948, Serial No. 11,482

9 Claims. (Cl. 25—41)

1

My invention relates to vibrating means and more particularly to means for vibrating a mold body.

Although the vibrating mechanism of my invention may be employed in conjunction with a wide variety of materials, articles or machines it is particularly well adapted for use in the molding of cinder blocks or the like and I shall, therefore, illustrate it in that connection. Cinder blocks are composed of cement and an aggregate consisting primarily of cinders, or the like, the appregate being of such size that even when mixed with the cement and proper proportion of water it does not flow readily into spaces between the walls of a mold and cores which may be positioned therein. Consequently, it is necessary to vibrate the mold as the mix is fed into it in order that the mold space may be completely and compactly filled. Vibration not only causes complete filling of the mold and compacting of the material therein but also speeds up the molding operation.

In a competitive industry such as the building materials industry, speed is essential in the manufacturing operations. Hence, vibrating mechanism in conjunction with molds has been employed in both large and small operations of various kinds. For example, vibrating mechanism is employed in some of the larger cinder block manufacturing machines presently on the market which are adapted to produce 600 8″ x 8″ x 16″ cinder blocks an hour. The rate of production in such a machine depends in part upon automatic delivery by a feeding mechanism of measured charges of the mix from a supply source to a mold, but also depends upon vibration of the mix for a predetermined period of time. Vibration of the mold may start as the feeding mechanism begins to reach the mold and continues while the feed mechanism is over the mold, and as it is withdrawn from the mold. When the feed mechanism is withdrawn, it carries back with it any of the mix which has not gravitated into the mold with the assistance of the vibratory action. If, for any reason, the vibration of the mold has been irregular over its length, the mix will feed into the various cavities in the mold at different rates. Then when the feeding mechanism is withdrawn from the mold, it may carry with it some of the mix which has not yet been vibrated into the mold cavities. The resulting blocks may be of improper size, weight or structure.

In devices presently on the market, a vibrating mechanism for a mold consists of a frame

2 structure for holding the mold, and a pair of motor-driven shafts carried at either end of the frame. Each shaft carries an eccentric weight and, when the motors drive the shafts, the unbalanced weights on the shafts set up reactions in the supporting frame which causes the frame to vibrate and, consequently, to vibrate the mold. When the motors are de-energized, the shafts generally rotate different lengths of time before coming to a stop, whether or not braking elements are employed on the motors or shafts. This will occur for any of a number of reasons. The relative frictional fit and lubrication of the bearings of the motors or of the shafts, or relative tightness of the intermediate driving means between the motors and shafts, or difference in operation of the brakes, may, and usually does, vary. Hence, the shafts stop with their eccentric weights at different positions. Then when the motors are energized for a subsequent driving of the shafts, the reactions caused by the eccentric weights will not be synchronized but, instead, may oppose each other and may cancel some of the vibrator action which is needed. Such non-synchronization usually causes the frame and mold to rock or pivot about a shifting axis lying somewhere between the shafts. The ends of the frame and mold are, therefore, moved vertically to a greater extent and are vibrated more strenuously than are the midportions. As a result the charge of the mix which is delivered to the mold feeds into the cavities at the ends of the mold more quickly and compactly than it does into the center portions. If the mold is adapted to form a plurality of blocks, the center ones will differ in weight, size or structure. For example, in blocks manufactured by a machine employing known vibrating mechanism, I have found that the center blocks may be one pound less in weight, out of a total of fourteen pounds, than are the end blocks. Such lack of uniformity is most undesirable.

It is the principal object of my invention to provide a means for producing substantially uniform vibration of the mold over its entire length so that there is uniform, rapid filling and compacting of the mix in the mold. In accomplishing the foregoing objective, I coordinate the positions of the eccentric weights, hereinafter sometimes referred to as "eccentrics," prior to the time when their shafts are rotated. Subsequently, the entire mold is moved in a vertical direction substantially equal amounts over its entire length when the shafts and eccentrics are driven synchronously from their coordinated positions. The manner of coordinating the positons of the shafts and of driving them synchronously will be described more fully hereinafter.

Other objects, uses and advantages will become apparent from the following description when taken with the accompanying drawings in which:

Figure 1 is a fragmentary, perspective view of mechanism embodying my invention;

Figure 2 is a fragmentary, sectional view, on the line 2—2 of Figure 1, showing a pair of shafts having their eccentric weights in non-coordinated position; and Figure 3 is a fragmentary, sectional view of the shafts and eccentric weights of Figure 2 in coordinated position.

Referring now particularly to Figure 1, which illustrates, fragmentarily, an automatic cinder block molding machine, there will be seen a supporting frame 1 for a mold 3. The frame 1 and mold 3 could, of course, be an integral structure which could be designated in its entirety as a "mold body." However, for convenience in the manufacture of a variety of different sizes of blocks, and other structural elements, the mold 3 is shown as being separate but carried rigidly within the frame 1 between frame members 5, 5 so that any vibrations produced in the frame are transmitted to the mold 3. With such construction molds for other forms of blocks may then be substituted for the mold 3.

Interiorly of the mold 3 there may be a plurality of dividing walls, such as the wall 7, which form separate compartments 9 so that multiple units of blocks or other structural elements may be manufactured simultaneously. Cores 11 fixed in compartments 9, together with the dividing walls 7 and outer walls 13, define mold cavities 15 of restricted horizontal cross section. The mold 3 may have for its bottom a pallet 17 which is adapted to be raised and supported in place against the bottom of the mold by a plurality of supporting plates, or pallet pushers 19. The frame 1 has independent supporting means (not shown) and the pallet pusher plates 19 may be resiliently or otherwise supported together in their various positions, one of which positions is below the chain feeding mechanism, which is indicated generally by the reference numeral 21. The details of the various supporting means are not, however, required for an understanding of my invention.

Above the mold 3 there is positioned a guide mechanism, indicated generally by the reference numeral 23, which guides a feeding mechanism, indicated by the reference numeral 25, in its movement from a position beneath a hopper (not shown), wherein the feeding mechanism is in the dotted line position of Figure 1, to the position as shown in Figure 1, wherein the feeding mechanism has moved over the top of the mold 3 to deliver a measured charge of mix formed of cement, cinders and water. The feeding mechanism 25 is open at its bottom and, consequently, a wall 27 is supported beneath the guide. The chain drive mechanism 21 is of the endless belt type and is indicated only fragmentarily. It is adapted to feed a series of pallets forward in correct spaced relation from a stack of pallets (not shown) behind and below the mold 3. As a pallet moves into position over the retracted pallet pusher plates 19, the pallet pusher plates are adapted to rise and lift the pallet upwardly against the bottom of the mold 3. At this time the feed mechanism 25 is in its rearward position (the dotted line position of Figure 1) beneath a hopper (not shown) which is adapted to hold a large quantity of the mix. When a pallet such as pallet 17 is firmly in place beneath the mold 3, the feed mechanism 25 is automatically moved forward to carry with it a charge of the mix, and, as the feed mechanism 25 begins to slide over the top of the mold, the frame 1 and mold 3 are vibrated in a manner to be explained below. Vibration of the frame and mold continues as the feed mechanism 25 moves into its forward position, as shown in Figure 1 (all of the mix being removed for clearness of illustration). After a predetermined period, the feed mechanism 25 is retracted toward its dotted line position and any excess of mix which has not been vibrated down into the cavities 15 of the mold compartment 9 is carried back so that the top surface of the mold is leveled. Vibration of the mold and frame 1 may continue during retraction of the feed mechanism 25.

When the feed mechanism 25 has been fully retracted, a pressing head (not shown) may descend from a position above the guide 23 and mold 3 to press the mix firmly into the mold cavities 15 against the resistance of the pallet 17. After such a pressing head has descended a predetermined amount in order to compress the mix and form a block of a certain height the pallet presser plates 19 and the pressing head descend together in spaced relation and the formed block, or blocks, descend from the mold on the pallet 17 until the pallet presser plates 19 pass below the level of the feed chain mechanism 21 whereupon the pallet is carried forward on mechanism 21 for discharge at the front end thereof as shown by pallet 17' carrying blocks 29, which are shown in dotted outline. While the formed blocks are being carried forward on a pallet 17', another pallet is simultaneously being forwarded by the chain feed mechanism 21 and presser plates 19 into position beneath the mold 3. The timed operations of the pallets and their supporting mechanism may be carried out by power means and controls of a known type which do not form a portion of my invention.

The vibrating mechanism for the frame 1 and mold 3 will now be described. The front wall 31 and rear wall 33 of frame 1 support a pair of rotatable shafts 35 and 37. The rear end of the shafts 35 and 37, as viewed in Figure 1, find a bearing in the wall 33 and the forward ends find a bearing in the wall 31 and extend therethrough and have secured onto their free ends pulley wheels 39 and 41, respectively. A drive belt 43 connects the pulley wheel 39 with the pulley 45 which is connected to the drive shaft of an electric motor 47. Similarly, pulley wheel 41 is in driving connection with pulley wheel 49 on the drive shaft of electric motor 51 by means of a belt 53. When the motors 47 and 51 are energized they drive shafts 35 and 37, respectively, in opposite directions as indicated by the arrows.

Each of the shafts carries a pair of eccentric weights, such as the weights 55 of shaft 35 and weights 57 of shaft 37. Although the eccentric weights 55 and 57, hereinafter sometimes referred to as "eccentrics," may be formed as circular disks (as shown in Figure 1) which are mounted on the shafts in an off center relationship, they may take any one of a number of other shapes, just so long as each pair provides a center of gravity, for the combined shaft and weights, which lies outside of the axis of the shaft. Each of the weights 55 are preferably of the same size, shape and weight as is the case with the weights, or eccentrics, 57. It is also desirable that the total weight and eccentricity of the pairs 55 and 57 be substantially the same. When the shafts 35 and 37 are driven, the fact that the center of gravity of each shaft plus its weights lies to one side of the central axis of the shaft will cause a reaction in the supporting means for the shaft. As the center of gravity of a shaft and its weights moves upwardly, the frame 1 is pushed downwardly. It will be readily seen that, if the centers of gravity of the respective shafts and their weights rise simultaneously to the uppermost portion of their circular paths, both ends of the frame 1 will simultaneously be driven downwardly. Then when the centers of gravity of the respective shafts and their weights descend to the lowermost position in their respective circular paths, both ends of the frame 1 will be equally urged upwardly. Since the motors are driven at a high speed, the rotation of the shafts, and the resulting reactions, causes a vibratory movement of the frame and the mold carried therein. The vibrations cause the mix, which is delivered over the mold, to be shaken down, with the assistance of gravity, into the mold cavities 15 within the mold 3.

From the foregoing explanation, it is now believed that it will be obvious that, if the centers of gravity of the respective shafts and their weights do not rise to the uppermost portion of their circular paths substantially simultaneously, the reaction in one end of the frame may be upwardly while the reaction in the other end of the frame may be downwardly. As the result, the frame and mold may have a rocking or pivoting action about an axis lying somewhere between the shafts 35 and 37. As a result the central portions of the frame and mold will receive less vertical movement and vibration than the ends. This results in the mix being fed into the cavities 15 at the ends of the mold nearest the shafts at a greater rate than the mix is fed into the mold cavities 15 in the intermediate portions of the mold. Consequently, when the feeding mechanism 25 is retracted and scrapes off the excess of the mix from the top of the mold, lesser amounts of the mix will have been fed into the intermediate compartments 9 of the mold 3 so that the blocks formed therein will be lighter in weight and may be of a different size and structure than the end blocks. The rocking or pivoting motion of the frame and mold as described above appears in molding devices presently on the market and it is the principal object of my invention to eliminate such movement and to substitute therefor uniform vibration of the frame and mold over the entire length of said mold. The manner in which this is accomplished will now be described.

It will be apparent from the above description that it is necessary to synchronize the movement of the shafts with their eccentrics, so that the centers of gravity of the shafts and their weights will rise and fall together, or, to put it in another way, reach the top and bottom portions of their orbits at substantially the same time. Even though the motors 47 and 51 may be started simultaneously and the shafts 35 and 37 may be driven in the synchronized manner just described, when the motors are shut off the shafts 35 and 37 may not rotate for the same length of time and, as a result, their centers of gravity will not stop in coordinated positions with respect to each other, but rather may lie at different angles in their arcuate paths. Such positions are illustrated in Figure 2, the dotted line positions being those which the eccentric weights would assume if free to rotate in response to the force of gravity. This occurs in cinder block manufacturing machines presently on the market even though brakes may be associated with the motor or directly applied to the shafts 35 and 37, since the brakes themselves may not be applied with equal pressure. In the mechanism illustrated in Figure 1 electric brakes of a known type, illustrated diagrammatically at 59 and 61, are employed for the respective motors 47 and 51. In this form of brake, energization of the motor simultaneously energizes a solenoid within the braking mechanism 59 and retracts the braking element of the mechanism. When the motor is de-energized the solenoid is also de-energized and the spring loaded brake element of the braking mechanism acts to brake the movements of the motor. Brakes of this type are well known and I have, therefore, illustrated them only diagrammatically.

After each vibrating period, for the frame 1 and mold 3, I may place the shafts 35 and 37 and their respective eccentrics 55 and 57 in coordinated position by releasing the electric brakes 59 and 61. This may be done, for example, by manual controls 63 and 65 on the brakes 59 and 61, respectively, so that the weights 55 and 57 will, through the action of gravity, rotate themselves and their respective shafts to a position wherein their centers of gravity are at the lowermost positions of their arcuate paths. As a result of this action the shafts and eccentrics will assume the positions illustrated in Figure 3. Then, when the motors 47 and 51 are simultaneously started, the shafts and their weights are driven in synchronism and substantially equal amounts of vibration are produced throughout the full length of the mold 3. After the motors are de-energized and the brakes have stopped rotation of the shafts 35 and 37, I may again release the brakes so that the vibrating means, namely, the shafts and their weights, are coordinated again prior to re-energizing the motors.

In order to make the coordination of the shafts and weights automatic, I provide a control mechanism for the electric brakes 59 and 61 and for the motors 47 and 51. The control mechanism will be more readily understood following a description of the wiring diagram of Figure 1. The reference characters L1 and L2 indicate the two lines connected to a source of power. A connecting wire 67 extends from line L1 to the upper movable arm 69 of a switch mechanism, which is indicated generally by the reference numeral 71. Arm 69 carries an electrical contact 73 and lower arm 75 of the switch 71 carries an electrical contact 77. Contact 77 is connected with line L2 by a series connection including the wires 79 and 81, closed contacts 83 of the electric brake 59, and the wire 85 which connects with line L2. It will also be observed that wire 79 extends from contact 77 to the closed contacts 87 of the electric brake 61 and from there a wire 89 connects with line L2. In other words, the brakes 59 and 61 are connected in parallel with the lines L1 and L2, with a switch 71 being interposed between line L1 and the brakes 59 and 61.

In a similar manner a wire 91 extends from line L1 to the lower arm 92 of a second switch, which is indicated generally by the reference numeral 93. The lower arm of switch 93 has an electrical contact 95 which is adapted to be engaged by the electrical contact 97 of the movable upper arm 99 of switch 93. The upper arm 99 connects to a wire 101. A wire 103 extends from the wire 101 to the motor 47 and from there a wire 105 extends to the line L2. Wire 101 also connects, by means of wire 107, to the motor 51 and from there a wire 109 extends to the line L2. In other words the motors are connected in parallel with lines L1 and L2 and there is a switch 93 between the source of power and the two motors. From the foregoing, it will be apparent that when switch 71 is open no current is supplied to the electrically controlled brakes 59 and 61 and, consequently, the spring-loaded braking means are rendered effective, since the solenoid is not energized to retract the breaking means. On the other hand, when switch 71 is closed, the solenoids of the electric brakes are energized and withdraw the braking elements against the action of their springs, so that the brakes are released. When switch 93 is closed, current is supplied to each of the electric motors 47 and 51 to energize the same. On the other hand, when switch 93 is open the motors are not energized. It will be immediately apparent that switch 71 should be closed during such time as the switch 93 is closed to energize the motors 47 and 51 otherwise, the brakes would be acting to retard the motor while the motors are being driven. Because I propose to release the braking means for each shaft prior to the time when the electric motors 47 and 51 are energized, in order that the eccentric weights 55 of shaft 35 and eccentric weights 57 of shaft 37 may rotate to their lowermost positions by gravity, switch 71 should be closed in advance of the closing of the switch 93. Although the closing of switch 71 need only be momentary, in the preferred form of my invention I maintain the switch 71 closed until and during the closing of switch 93 which actuates the motors. At the end of the vibratory movement of the frame and mold, both switches 71 and 93 may be opened at the same time, in order to de-energize the motors and simultaneously to apply the braking means. Then, before the next vibratory period begins, switch 71 is again closed prior to the closing of switch 93, so that the eccentric weights 55 and 57, if not in coordinated positions with respect to each other, may be put in such positions by their rotation, under the force of gravity, to their lowermost positions. Control mechanism 111 includes a cam plate 113 which controls the opening and closing of switch 71 and a second cam plate 115 which controls the opening and closing of switch 93. The movable upper arm 69 of switch 71 is either urged away from the lower arm 75 by being itself formed as a spring member, or by being connected to an arm 117 which is pivoted at 118 and is urged upwardly by spring means (not shown) of a known type. Similarly, the upper arm 99 of switch 93, by being formed as a spring member, may be urged upwardly and out of contact with the lower arm 92 or by being connected to an arm 119 which is pivoted at 120 and is urged upwardly by spring means (not shown) of a known type. The arms 117 and 119 each carry a roller member at their respective free ends, which rollers bear against the edges of the cam plates 113 and 115, respectively. In the control mechanism illustrated in Figure 1 I have shown the upper movable arms of the switches 71 and 93 as being connected to the pivoted arms 117 and 119, respectively, but it will be appreciated that other forms of interconnection may be employed.

Cam plate 113 has a raised portion, or cam surface, 121 on its periphery and cam plate 115 has a raised portion, or cam surface, 123 on its periphery, which surfaces are adapted, when bearing against the rollers of the arms 117 and 119 to close the switches 71 and 93 respectively. As shown in Figure 1, the cam surface 121 is longer than the cam surface 123 and the plates are adapted to rotate together in a clockwise direction with the cam surface 121 in advance of the cam surface 123. This means that cam plate 113 will close the switch 71 slightly in advance of the time when cam plate 123 will close the switch 93. It will be observed that the cam surfaces 121 and 123 terminate at substantially the same point, as indicated at 125, since it is desirable to de-energize the motors 47 and 51 and to start applying the brakes 59 and 61 at that time. In any event the cam surfaces 121 and 123 of the cam plates should be relatively positioned so that switch 71 is not opened before switch 93 is opened, otherwise the brakes would be applied to the motors before the motors are de-energized.

When the vibrating means of my invention are incorporated in an automatic cinder block manufacturing machine the cam plates 113 and 115 may be associated with other control cams, indicated generally by the reference numeral 127, which other control cams may operate the pallet pusher plates 19 and a pressing head (not shown), so that the vibrating of the frame and mold may take place in correct timed relation with respect to the other operations of the machine.

As was explained above, in releasing the brakes 59 and 61 prior to energizing the motors 47 and 51, respectively, it is possible to do so without the automatic control mechanism 111 by using, instead, the manually controlled buttons 63 and 65 which may be adapted to release the brakes mechanically. It will be understood that other means for releasing the brakes may be provided, whether the brakes operate in conjunction with the motors, the shafts 35 and 37, or other mechanism and that the primary object of my invention is to place the vibrating means, consisting of the shafts 35 and 37 with their eccentric weights, in coordinated positions prior to actuation thereof by some driving means, such as electric motors 47 and 51.

Another way in which I can assure coordination and synchronization of the movement of the vibrating means such as the weights 55 and 57 on shafts 35 and 37, respectively, is to interconnect the shafts 35 and 37 by a direct, non-slipping means such as the sprocket and chain drive indicated in dotted outline and referred to generally by the letter A of Figure 1. In this form of the invention, the motors 47 and 51 cooperate in driving both of the rotatable shafts 35 and 37. It is, of course, necessary that in providing such chain drive between shafts 35 and 37 that the position of the weights 55 and 57 initially be coordinated, so that the centers of gravity of the shafts will simultaneously reach the uppermost positions of their paths and will simultaneously reach their respective lowermost positions so that the mold will be uniformly vibrated along its length. It will be obvious, also, that in the arrangement just mentioned one motor may be employed instead of two since the shafts are connected together by direct driving means. Other forms of directly interconnecting the shafts 35 and 37 may be employed, so long as shafts 35 and 37 rotate in opposite directions as indicated by the small arrows in Figure 1.

Although I have shown a preferred embodiment of my invention it will be readily apparent in view of the present disclosure that certain modifications may be made therein without departing from the scope of the invention as defined by the appended claims.

I claim:

1. In combination, a mold body, a pair of rotatable shafts, each shaft having its center of gravity lying to one side of its axis of revolution, one of said shafts being carried adjacent one side of the mold body and the other shaft being carried adjacent the opposite side of the mold body, said shafts, when rotated, being adapted to vibrate the mold body, driving means for the shafts, said driving means comprising a separate motor for rotating each shaft, brake means adapted to be applied to the shafts to stop their rotation following driving thereof, and means for releasing the brake means prior to subsequent driving of the shafts, whereby gravity will coordinate the positions of the shafts.

2. In combination, a mold body including shaft-supporting means at opposite ends of the body, a rotatable shaft carried by the mold body in both shaft-supporting means, an eccentric weight fixed on each shaft, said eccentric weights being adapted to cause vibratory movement of the mold body when the shafts are rotated, driving mechanism for each shaft, and mechanism for positioning the shafts prior to driving thereof so that the shafts and their eccentric weights are coordinated in position whereby their respective vertically upward and vertically downward vibrations will be synchronized so that the mold will be vibrated substantially uniformly over its entire length.

3. In combination, a mold body, a rotatable shaft supported at each end of the mold body, an eccentric weight fixed to each shaft, each shaft being adapted to be motor driven by a separate motor, braking means adapted to be automatically applied to each shaft whenever its motor is de-energized, means for releasing the brakes when the motors are re-energized whereby the force of gravity will rotate the shafts into positions wherein the eccentric weights are in their lowermost positions.

4. In combination, a mold body, a rotatable shaft supported at each end of the mold body, an eccentric weight fixed to each shaft, each shaft being adapted to be driven by an electric motor, a brake mechanism for each shaft, control means for automatically applying each brake mechanism when the associated motor is shut off, control means for releasing the brakes prior to the starting and operation of the motors whereby the eccentrics will rotate into their lowermost positions by gravity, and control means adapted to start the motors simultaneously after the eccentrics have reached their lowermost positions.

5. In a cinder block-making machine having an element movable during operation of the machine, the combination of a mold body, a frame structure adapted to be carried on said machine for supporting the mold body, a rotatable shaft supported in the frame structure adjacent each of two opposite ends of the mold body, each shaft having its center of gravity lying to one side of its axis of revolution, driving mechanism for each shaft, mechanism for positioning the shafts prior to driving thereof so that the shafts will have their centers of gravity coordinated in position, and control mechanism for said driving mechanisms and positioning mechanism comprising an electrical circuit adapted to be connected to a source of power and including in series an electrical switch and the driving mechanisms, an electrical circuit adapted to be connected to the source of power and including in series a second switch and means for controlling the positioning mechanism, first operating mechanism adapted to be operatively connected with the movable element of the block-making machine for closing the first mentioned switch to energize the driving mechanisms, and a second operating mechanism adapted to be operatively connected with the movable element of the block-making machine for closing said second switch, said operating mechanisms of the control mechanism being operated by the movable element of the cinder block-making machine in sequence, whereby the second switch is adapted to be closed before the first mentioned switch is closed, whereby the positioning mechanism positions the shafts in coordinate position before the driving mechanisms are energized for synchronously driving the shafts.

6. In combination, a mold body, a frame structure for supporting the mold body, a rotatable shaft supported by the frame structure adjacent opposite ends of the mold body, an eccentric weight fixed on each shaft, each shaft being adapted to be driven by an electric motor, a brake mechanism for each shaft, control means for automatically applying each brake mechanism when the associated motor is shut off, control means for releasing the brakes prior to the starting and operation of the motors whereby the eccentrics will rotate into their lowermost positions by gravity, and control means adapted to start the motors simultaneously after the eccentrics have reached their lowermost positions.

7. In combination, a mold body, a frame structure for supporting the mold body, a rotatable shaft supported adjacent opposite ends of the mold body by the supporting frame, each shaft having its center of gravity lying to one side of its axis of revolution so that the shafts are adapted to cause vibratory movement of the mold body when the shafts are rotated, driving mechanism for each shaft, and mechanism for positioning the shafts prior to driving thereof so that the shafts and their eccentric weights are coordinated in position, whereby their respective vertically upward and vertically downward vibrations will be synchronized so that the mold will be vibrated substantially uniformly over its entire length.

8. In combination, a mold body including shaft supporting means at opposite ends of the body, a rotatable shaft carried by the mold body in both shaft supporting means, an eccentric weight fixed on each shaft, said eccentric weights being adapted to cause vibratory movement of the mold body when the shafts are rotated, driving mechanism for each shaft, mechanism for positioning the shafts prior to driving thereof so that the shafts and their eccentric weights are coordinated in position whereby their respective vertically upward and vertically downward vibrations will be synchronized, so that the mold will be vibrated substantially uniformly over its entire length, and control mechanism for thereafter starting said driving means simultaneously in order to maintain the rotatable shafts in coordinated position while they are rotated.

9. In combination, a mold body, a frame structure for supporting the mold body, a rotatable shaft supported by the frame structure adjacent opposite ends of the mold body, an eccentric weight fixed on each shaft, said eccentric weights being adapted to cause vibratory movement of the mold body when the shafts are rotated, driving mechanism for each shaft, mechanism for positioning the shafts prior to driving thereof so that the shafts and their eccentric weights are coordinated in position whereby their respective vertically upward and vertically downward vibrations will be synchronized, so that the mold will be vibrated substantially uniformly over its entire length, and control mechanism for thereafter starting said driving means simultaneously in order to maintain the rotatable shafts in coordinated position while they are rotated.

GEORGE L. OSWALT.

References Cited in the file of this patent

UNITED STATES PATENTS

| Number | Name | Date |
| --- | --- | --- |
| 1,700,156 | Copeman | Jan. 29, 1929 |
| 1,708,839 | Jarrett-Knott | Apr. 9, 1929 |
| 1,806,620 | Flam | May 26, 1931 |
| 1,922,168 | Lowell | Aug. 15, 1933 |
| 2,054,476 | Derry et al. | Sept. 15, 1936 |
| 2,106,329 | Scott | Jan. 25, 1938 |
| 2,261,257 | Kiesskalt et al. | Nov. 4, 1941 |
| 2,407,168 | Lindkvist | Sept. 3, 1946 |